United States Patent
Murphy

(10) Patent No.: US 9,666,099 B2
(45) Date of Patent: May 30, 2017

(54) DRIVER CONTROL ASSISTANCE SENSOR AND METHOD

(71) Applicant: Gerald Murphy, Broomall, PA (US)

(72) Inventor: Gerald Murphy, Broomall, PA (US)

( * ) Notice: Subject to any disclaimer, the term of this patent is extended or adjusted under 35 U.S.C. 154(b) by 25 days.

(21) Appl. No.: 14/776,017

(22) PCT Filed: Mar. 14, 2014

(86) PCT No.: PCT/US2014/027791
§ 371 (c)(1),
(2) Date: Sep. 14, 2015

(87) PCT Pub. No.: WO2014/152802
PCT Pub. Date: Sep. 25, 2014

(65) Prior Publication Data
US 2016/0027337 A1   Jan. 28, 2016

Related U.S. Application Data

(60) Provisional application No. 61/781,304, filed on Mar. 14, 2013.

(51) Int. Cl.
*B60Q 1/00* (2006.01)
*G09B 19/16* (2006.01)
*B60W 50/14* (2012.01)
*B60R 16/023* (2006.01)
*G08B 21/24* (2006.01)

(52) U.S. Cl.
CPC ........ *G09B 19/167* (2013.01); *B60R 16/0232* (2013.01); *B60W 50/14* (2013.01); *G08B 21/24* (2013.01)

(58) Field of Classification Search
CPC .. G08B 21/24; G09B 19/167; B60R 16/0232; B60W 50/14; B60W 2040/0818; B60W 2040/0872; B60W 2540/22; B60W 40/08; A61B 5/1114; A61B 5/18; A61B 5/6893; B60K 28/06
USPC ............ 340/454, 439, 575, 576, 425.5, 457, 340/426.32; 180/271; 701/34, 34.1, 70
See application file for complete search history.

(56) References Cited

U.S. PATENT DOCUMENTS

| | | | |
|---|---|---|---|
| 4,901,055 A * | 2/1990 | Rosenberg | B60Q 1/441 188/DIG. 1 |
| 5,810,107 A | 9/1998 | Krel | |
| 6,747,550 B2 * | 6/2004 | Stone | B60T 7/02 340/407.1 |
| 2008/0229869 A1 | 9/2008 | Willemsen et al. | |
| 2010/0265074 A1* | 10/2010 | Namba | G06K 9/00771 340/576 |

(Continued)

OTHER PUBLICATIONS

Driver's Ed Guru, Stage 1: The Pivot Method. Drivers's Ed Guru, Feb. 16, 2013. [Retrieved on Jul. 11, 2014]. Retrieved from internet: <URL:http://web.archive.org/web/20130216093418/http://www.driversedguru.com/drivers-ed-training-exercies/stage-1/stage-1-the-pviot-method>. entire document.

*Primary Examiner* — Anh V La
(74) *Attorney, Agent, or Firm* — Volpe and Koenig, P.C.

(57) ABSTRACT

An arrangement for training a vehicle driver or improving driving ability having a sensor located in a position beneath a motor vehicle brake pedal. A warning indicator is connected to the sensor to provide a signal when the sensor detects that a driver's heel is not in contact with a floor of the vehicle during braking.

9 Claims, 2 Drawing Sheets

(56) References Cited

U.S. PATENT DOCUMENTS

2011/0251822 A1 10/2011 Darley et al.
2013/0009761 A1 1/2013 Horseman
2013/0245894 A1 9/2013 Huth et al.

* cited by examiner

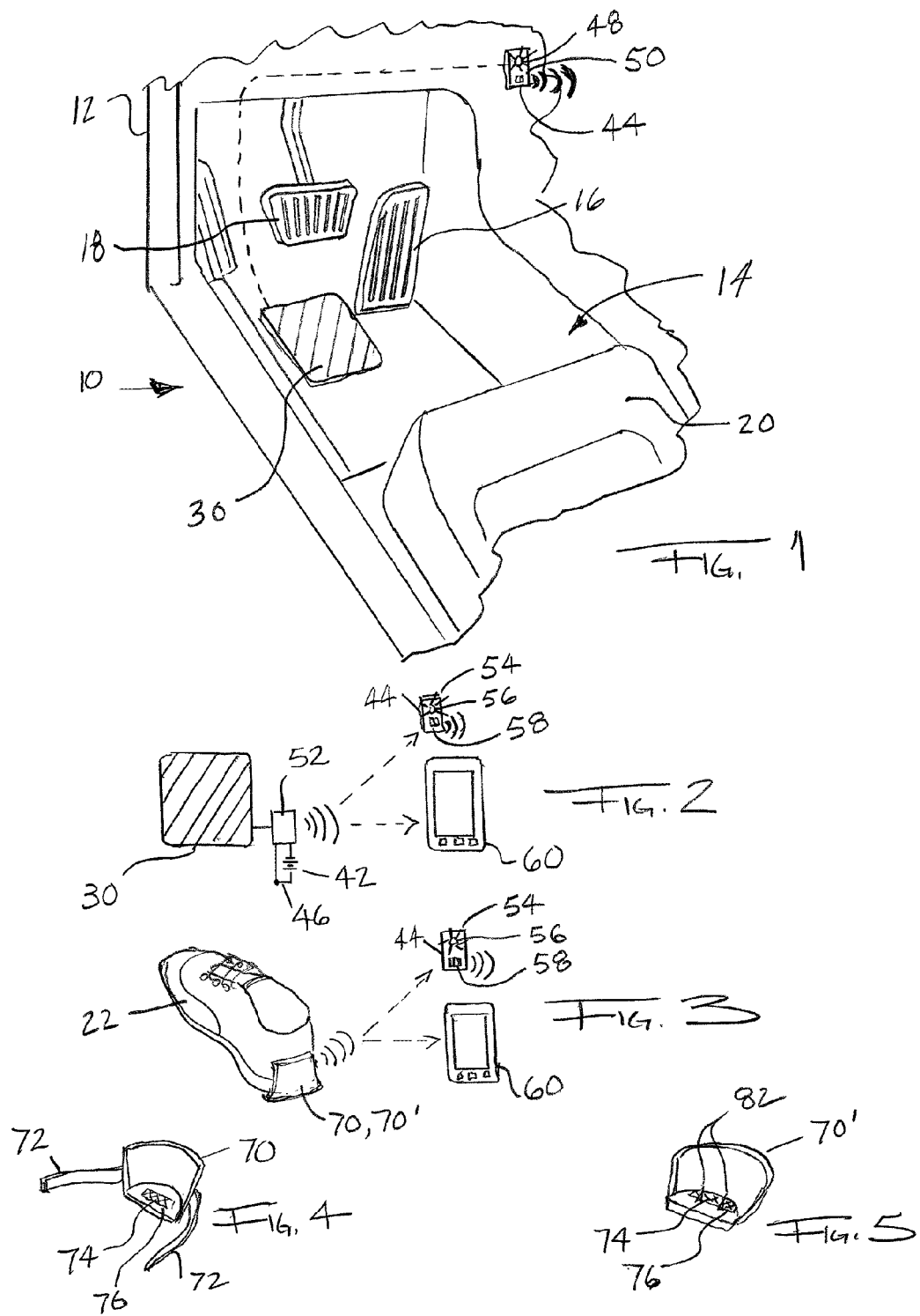

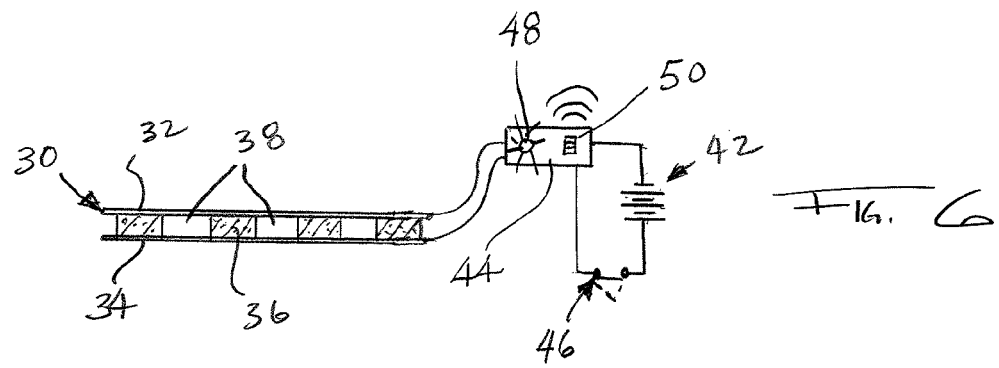
FIG. 6
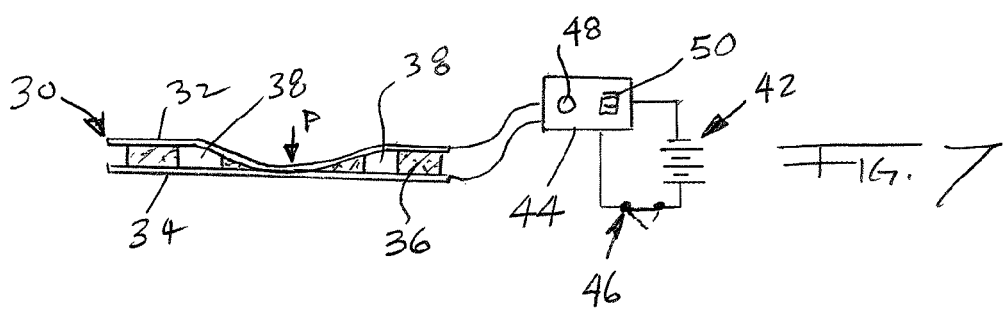
FIG. 7
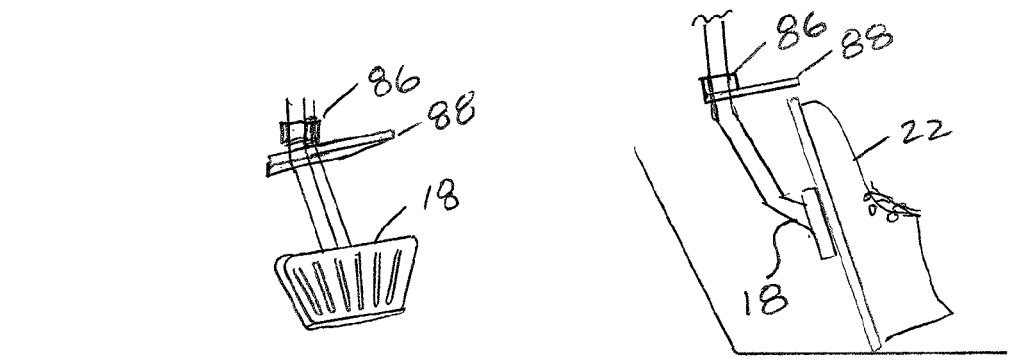
FIG. 8
FIG. 9

DRIVER CONTROL ASSISTANCE SENSOR AND METHOD

INCORPORATION BY REFERENCE

The following documents are incorporated herein by reference as if fully set forth: U.S. Provisional Application No. 61/781,304, filed Mar. 14, 2013.

BACKGROUND

The present invention relates to a driver control assistance sensor and method for improving a driver's control of a vehicle.

Driver training has become increasingly important as more motor vehicles are on the roads. While many inventions attempt to assess and warn a driver when they become inattentive, control of a vehicle involves how a driver steers as well as how a driver applies pressure to a gas pedal and a brake pedal during driving. The present invention seeks to provide a system that assists a driver with vehicle control through a sensor and a training method using such a system.

SUMMARY

The present inventor has observed that control during braking of a motor vehicle is tied to whether a driver keeps their heel or foot correctly grounded on the vehicle floor while pressing the brake pedal while driving. If the heel of the foot lifts from the floor surface during braking, control can be instantaneously compromised and proficient driving skills are more difficult to achieve. As braking is one of the required fundamental skills for driving, this must be mastered in order for a driver to obtain an adequate level of competency in driving. In situations when the heel/foot of the driver becomes ungrounded while pressing the brake pedal, control, maneuverability, and a drivers confidence are compromised. This can result in the driver swerving on or over the yellow line on a winding road, or with 90° moving turns, especially when turning downhill, as well as an uneven jerking starting and stopping as the car slows down. For new drivers just learning to drive, it has also been observed that when the heel/foot becomes ungrounded during downhill turns, the steering wheel itself can be rendered almost useless and the hands become unable to catch up and steer back as the vehicle naturally accelerates and leaves the intended path of travel. Harsh braking is also quite common in brand new drivers and is typically a main source of tension, nervousness and anxiety, not only for the driver, but also for the practice partner/parent.

In order to address this, an arrangement for training a vehicle driver for improving driving ability is provided. The arrangement includes a sensor located in a position beneath a motor vehicle brake pedal, and a warning indicator connected to the sensor to provide a signal when the sensor detects that a driver's heel is not in contact with the floor of the vehicle.

In one aspect, the sensor is a pressure sensitive switch.

In another aspect, the warning indicator is connected either directly or wirelessly to the sensor. The warning indictor can be hard-wired or fixed within a vehicle from the manufacture, or can be provided as a separate indicator.

Preferably, the warning indicator provides at least one of an audio, visual, or vibration signal to a driver.

In one preferred arrangement, the sensor is a pressure sensitive pad that is installed in a motor vehicle on the floor beneath the brake pedal. In another arrangement, the sensor is attached to a heel of the driver's shoe.

In another aspect, the sensor communicates wirelessly with a wireless communication device, such as a smart phone, PDA or other wireless device. To provide a warning.

Other features and benefits of the invention are discussed below as well as in the claims.

BRIEF DESCRIPTION OF THE DRAWINGS

The foregoing summary and the following detailed description will be better understood when read in conjunction with the appended drawings, which illustrate preferred embodiments of the invention. In the drawings:

FIG. 1 is a perspective view looking at a driver's compartment of a motor vehicle equipped with the sensor arrangement according to the invention.

FIG. 2 is a schematic diagram showing the sensor arrangement using a pressure sensor connected wirelessly to a warning indicator.

FIG. 3 is a schematic view showing an alternate arrangement of a pressure sensor on a heel of a driver's shoe which communicates wirelessly with a warning indicator.

FIG. 4 is a perspective view showing a first embodiment of a heel cup for connection to a driver's shoe.

FIG. 5 is a perspective view of a second embodiment of a heel cup for connection to a driver's shoe.

FIG. 6 is a schematic diagram showing a pressure sensor arrangement connected to a controller which includes at least one warning indicator.

FIG. 7 is a view similar to FIG. 6 showing the pressure sensor detecting that pressure is being applied.

FIG. 8 is a perspective view of a brake pedal showing an attachment bracket used as a training device.

FIG. 9 is a side elevational view showing the training attachment bracket on the brake pedal in use.

DETAILED DESCRIPTION OF THE PREFERRED EMBODIMENTS

Certain terminology is used in the following description for convenience only and is limiting. The words "front," "back," "top" and "bottom" designate directions in the drawings to which reference is made. The words "inwardly" and "outwardly" refer to the directions toward and away from the parts referenced in the drawings. A reference to a list of items that are cited as "at least one of a, b, or c" (where a, b and c represent the items being listed) means any single one of the items a, b, or c, or combinations thereof. The terminology includes the word specifically noted above, derivatives thereof and words of similar import.

Referring to FIG. 1, the sensor arrangement 10 according to the invention is shown installed in the driver compartment 14 of a motor vehicle 12 (partially illustrated). The driver compartment 14 includes the gas pedal 16, brake pedal 18, and seat 20. The instrument panel and the steering wheel are not illustrated but would be located above the area shown in the customary manner. According to the invention, the sensor arrangement 10 includes a heel sensor pad 30 that is connected to a controller 44 which either includes at least one of a warning light 48 or a speaker 50 or is connected to a warning light 48 or a speaker 50.

As shown in FIGS. 6 and 7, one embodiment of the heel sensor pad 30 is a pressure sensor formed by two conductive layers 32, 34 which are separated by an insulating spacer layer 36, preferably made of a compressible foam. A number of contact holes 38 are provided through the insulating layer 36. As shown in FIG. 6, when no pressure is applied to the sensor pad 30, the conductive layers 32, 34 are insulated from one another. As shown in FIG. 7, when pressure (indicated by an arrow P) is applied to one of the two conductive layers 32, 34, it deflects into contact with the other of the two conductive layers 32, 34 by compressing the insulating spacer layer 36, creating an electrical contact. As shown in FIGS. 6 and 7, a switch 46 is preferably provided in the circuit between the controller 44 and a battery 42. When the switch 46 is closed the controller 44 can detect when contact is made between the conductive layers 32, 34 as well as when no contact is made. In the event that no contact signal is provided, a warning indicator such as the warning light 48 or an audio warning from the speaker 50 can be provided.

The controller 44 is preferably hard-wired into the vehicle and the sensor pad 30 can be placed below the carpet so that it is semi-permanently installed or can be installed on the carpet as a durable vinyl area that is bonded to the carpet around its periphery during manufacture, which may be useful to maintain sensitivity after a removable floor mat is placed over it. Alternatively, the sensor pad 30 can be on or part of a floor mat. Here, the controller 44 can also receive an input from the brake light circuit so that the switch 46 is only activated when the brake 18 is applied. A timer can also be provided which would start once the brake is pressed and the brake light circuit is closed, and a time delay can be provided, such as one second, so that if a driver initially shifts their foot off the floor to contact the brake pedal 18, the signal does not generate a warning unless the sensor 30 provides an "open" signal for longer than a time period which should be sufficient time for a driver to place the driver's heel on the floor of the vehicle, such as 1 second. This would also provide some forgiveness due to regular routine shifting or sliding of the driver's foot.

In an alternative embodiment according to the invention, the heel sensor pad 30 as well as the controller 44 along with the warning indicators are provided as a separate device that is placed in the vehicle, but not hard-wired into the vehicle's brake light circuit. This would provide a warning whenever the foot becomes ungrounded for more than a pre-determined amount of time, for example one second or two seconds, which would be an acceptable amount of time for a driver to move their foot during routine movement, sliding or lifting when the brake pedal is not in use.

Referring now to FIG. 2, the sensor pad 30 is shown in an alternate embodiment where it includes a wireless signal emitter 52 that can be turned on and off by a switch 46 so that a wireless signal can be sent to either the controller 44 which includes the warning light 48 and speaker 50 as well as a wireless signal receiver, and/or can be wirelessly connected to a smart phone 60 which can act as a warning sensor that receives a wireless signal from the signal emitter 52 and can provide a visual, audio or vibration warning if the heel of the driver becomes ungrounded.

Referring to FIGS. 3-5, an alternate arrangement of the sensor is provided. Here, the sensor 74, which is preferably a pressure sensor similar to the pressure sensor described above, is provided in a heel cup 70, 70'. Preferably, the sensor 74 is connected to a wireless transmitter 76 which sends a signal to a smart phone or other wireless device 60 or to a controller 44 that includes a warning light and/or speaker to provide an audio warning. As shown in FIG. 4, the heel cup sensor 70 can be attached using Velcro straps 72. Alternatively, as shown in FIG. 5, the heel cup sensor 70' can include small spikes 82 which engage into the heel of a user's shoe. In either case the sensor 74, which is preferably a pressure sensor, is located at the heel of a driver's foot in order to detect whether or not the driver's heel becomes ungrounded during driving, and sends a signal so that a warning can be generated.

Although a wireless connection is illustrated for the heel cup sensor 70, 70' this can also be connected using a wired connection, such as via a USB cable, to a smart phone or other device 60. Preferably, if a smart phone is used an APP would be provided which a driver can download. This can also capture a history of the time that a driver lifts their heel and for how long.

According to the invention, the heel sensor pad 30 could be installed in a semi-permanent fashion or could be removably installed directed or on top of the floor area beneath the brake pedal 18. For such installations, the switch 46 should be accessible to allow a driver or trainer to enable or disable the system. Preferably, the sensor pad 30 is securely attached to the floor of the vehicle beneath the brake pedal 18 so that it cannot become dislodged in use. The sensor arrangement 10 can be powered via an adapter that plugs into a car electrical system by the cigarette lighter or can be provided with a separate battery.

While a pressure sensor 30 is shown, those skilled in the art will recognize that other types of sensors, such as a proximity sensor or visual detection system, could be utilized as the sensor within the scope of the invention.

Referring now to FIGS. 8 and 9, a training device according to the invention is provided. The training device includes a bracket 86 having a plate 88 attached thereto. The bracket 86 attaches to the brake pedal and can be set up or down to a position that limits a driver's shoe or foot from being placed too high on the brake pedal 18 up or near the brake arm. This would be flexible or bendable and make an unusual sound when contacted by a driver's foot and/or at least feel awkward when pressed by the driver's foot to provide a warning that the driver's foot has become ungrounded. The device would not interfere with normal braking operations of the vehicle or interfere with the driver's ability to press downwardly on the brake pedal 18 regardless of whether or not their foot became ungrounded during braking.

The sensor arrangement 10 and/or the training device can be used as a driver training aid for a limited time, or can be provided for more routine use.

Those skilled in the art will appreciate that various other modifications can be made to the sensor arrangement described above which would still fall within the scope of the present invention which is defined by the appended claims.

What is claimed is:

1. An arrangement for training a vehicle driver or improving driving ability, comprising:
    a sensor located only in a position beneath a motor vehicle brake pedal;
    a warning indicator; and
    a controller configured to receive an input from a vehicle brake system and the sensor, and configured to activate the warning indicator only during braking when the sensor detects that the driver's heel of a foot used for braking is not in contact with a floor of the vehicle.

2. The arrangement of claim 1, wherein the sensor is a pressure sensitive switch.

3. The arrangement of claim 1, wherein the warning indicator is connected wirelessly to at least one of the controller or the sensor.

4. The arrangement of claim 1, wherein the warning indicator is hard-wired to the vehicle.

5. The arrangement of claim 1, wherein the warning indicator provides at least one of an audio, visual, or a vibration signal.

6. The arrangement of claim 1, wherein the sensor is a pad that is installed in a motor vehicle on the floor beneath the brake pedal.

7. The arrangement of claim 1, wherein the sensor is attached to the heel of the driver's shoe.

8. The arrangement of claim 1, wherein the sensor communicates wirelessly via a wireless communication device to at least one of the controller or the warning indicator.

9. A method for sensing a position of a driver's heel during braking to improve vehicle control, comprising:
   providing a sensor located only in a position beneath a motor vehicle brake pedal, a warning indicator, and a controller configured to receive an input from a vehicle brake system and the sensor,
   the sensor detecting contact between a heel of the driver's foot and a floor of the vehicle, and providing a signal, and the controller activating the warning indicator upon detecting that the driver's heel is not in contact with the floor of the vehicle only during active braking of the vehicle.

\* \* \* \* \*